United States Patent
Samdanis et al.

(10) Patent No.: US 12,323,309 B2
(45) Date of Patent: Jun. 3, 2025

(54) APPARATUS AND METHOD FOR SUBSCRIBING ANALYTIC SERVICES TO A USER REPOSITORY IN THE 5G CORE NETWORK

(71) Applicant: NOKIA TECHNOLOGIES OY, Espoo (FI)

(72) Inventors: Konstantinos Samdanis, Munich (DE); Yannick Lair, Voisins le Bretonneux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 214 days.

(21) Appl. No.: 17/766,337

(22) PCT Filed: Sep. 4, 2020

(86) PCT No.: PCT/EP2020/074696
§ 371 (c)(1),
(2) Date: Apr. 4, 2022

(87) PCT Pub. No.: WO2021/063627
PCT Pub. Date: Apr. 8, 2021

(65) Prior Publication Data
US 2024/0056367 A1    Feb. 15, 2024

(30) Foreign Application Priority Data
Oct. 4, 2019    (EP) ..................... 19201514

(51) Int. Cl.
*H04L 41/50* (2022.01)
*H04L 41/5067* (2022.01)
*H04W 4/60* (2018.01)

(52) U.S. Cl.
CPC ...... *H04L 41/5032* (2013.01); *H04L 41/5067* (2013.01); *H04W 4/60* (2018.02)

(58) Field of Classification Search
CPC .......... H04W 8/20; H04W 8/18; H04W 8/24; H04W 8/186; H04W 4/60; H04L 41/5032; H04L 41/5067
See application file for complete search history.

(56) References Cited

U.S. PATENT DOCUMENTS 11,991,544 B2 * 5/2024 Puente ................. H04W 8/186
2017/0034023 A1 * 2/2017 Nickolov ............ H04L 43/0817
(Continued)

FOREIGN PATENT DOCUMENTS

| WO | WO-2020228966 A1 * | 11/2020 | ........... H04W 24/02 |
| WO | WO-2021018405 A1 * | 2/2021 | |
| WO | WO-2021023388 A1 * | 2/2021 | ........... H04L 41/145 |

OTHER PUBLICATIONS

International Search Report and Written Opinion dated Nov. 6, 2020 corresponding to International Patent Application No. PCT/EP2020/074696.

(Continued)

*Primary Examiner* — Dung Hong
(74) *Attorney, Agent, or Firm* — Lippes Mathias LLP (57) ABSTRACT

An apparatus is provided, in a user data holding entity, which comprises: at least one processor and at least one memory including computer program code, the at least one memory and the computer program code configured to, with the at least one processor, cause the apparatus at least to perform: holding analytics services information services information related to a user equipment or an application or application in the user data holding entity, and providing the analytic services information, which is related to the user equipment or to an application related to the user equipment, to a network element subscribed to the analytic services information related to the user equipment or application or (Continued)

to a network element such analytic services information related to the user equipment or application.

10 Claims, 7 Drawing Sheets

(56) References Cited

U.S. PATENT DOCUMENTS

| | | | |
|---|---|---|---|
| 2018/0262924 A1* | 9/2018 | Dao | H04W 72/535 |
| 2020/0228420 A1* | 7/2020 | Dao | H04L 41/5032 |
| 2020/0288296 A1* | 9/2020 | Fiorese | H04L 41/0895 |
| 2020/0396657 A1* | 12/2020 | Feder | H04W 36/0061 |
| 2021/0014141 A1* | 1/2021 | Patil | H04W 76/25 |
| 2021/0022022 A1* | 1/2021 | Guo | H04W 4/029 |
| 2021/0026751 A1* | 1/2021 | Larkin | G06F 11/324 |
| 2021/0168651 A1* | 6/2021 | Marquezan | H04W 28/0942 |
| 2021/0176649 A1* | 6/2021 | Rahman | H04L 41/40 |
| 2021/0273856 A1* | 9/2021 | Marquezan | G06F 16/164 |
| 2021/0288886 A1* | 9/2021 | Örtenblad | H04W 24/08 |
| 2022/0039046 A1* | 2/2022 | Ianev | H04W 60/00 |
| 2022/0103443 A1* | 3/2022 | Mary | H04L 43/14 |
| 2022/0263724 A1* | 8/2022 | Lair | H04L 43/0805 |
| 2022/0345925 A1* | 10/2022 | Garcia Martin | H04L 43/065 |

OTHER PUBLICATIONS

"Method and system to support detailed microblog data analysis, with rich semantic/context information included in analytic result ED—Darl Kuhn," ip.com, Apr. 25, 2012, XP013150359.
Nokia et al., "Optionality of data to be collected by NWDAF," 3GPP Draft; S2-1907600, SA WG2 Meeting #134, Sapporo, Japan, Jun. 24-28, 2019, Jun. 18, 2019, XP051752566.
Atos: "Data Analytics as a Service: unleashing the power of Cloud and Big Data," Mar. 26, 2013, pp. 1-18, XP055475715.
3GPP TS 23.502 V16.2.0 (Sep. 2019), Technical Specification, 3rd Generation Partnership Project; Technical Specification Group Services and System Aspects; Procedures for the 5G System (5GS); Stage 2 (Release 16), Sep. 2019.
3GPP TS 23.501 V16.2.0 (Sep. 2019), Technical Specification, 3rd Generation Partnership Project; Technical Specification Group Services and System Aspects; System Architecture for the 5G System (5GS); Stage 2 (Release 16), Sep. 2019.
3GPP TS 23.503 V16.2.0 (Sep. 2019), Technical Specification, 3rd Generation Partnership Project; Technical Specification Group Services and System Aspects; Policy and Charging Control Framework for the 5G System (5GS); Stage 2 (Release 16), Sep. 2019.
3GPP TS 23.288 V16.1.0 (Sep. 2019), Technical Specification, 3rd Generation Partnership Project; Technical Specification Group Services and System Aspects; Architecture enhancements for 5G System (5GS) to support hetwork data analytics services (Release 16), Sep. 2019.
3GPP TR 23.791 V16.2.0 (Jun. 2019), Technical Report, 3rd Generation Partnership Project; Technical Specification Group Services and System Aspects; Study of Enablers for Network Automation for 5G (Release 16), Jun. 2019.
3GPP TS 29.522 V16.2.0 (Dec. 2019), Technical Specification, 3rd Generation Partnership Project; Technical Specification Group Core Network and Terminals; 5G System; Network Exposure Function Northbound APIs; Stage 3 (Release 16), Dec. 2019.
China Mobile et al., "Proposed New SID on Enablers for Network Automation for 5G—Phase 2," 3GPP Draft; S2-1905157, 3GPP TSG-SA WG2 Meeting #133, Reno, USA, May 13-17, 2019.
Huawei et al., "Discussion on Further Criteria for NWDAF Discovery and Selection," 3GPP Draft; S2-1903811, SA WG2 Meeting #132, Xi'An, China, Apr. 8-12, 2019.

* cited by examiner

APPARATUS AND METHOD FOR SUBSCRIBING ANALYTIC SERVICES TO A USER REPOSITORY IN THE 5G CORE NETWORK

FIELD OF THE INVENTION

The present invention relates to an apparatus, a method and a computer program product for subscribing analytic services to a user repository in the 5G core network or a similar entity storing/holding user related data.

RELATED BACKGROUND ART

The following meanings for the abbreviations used in this specification apply:
AF: Application Function
BDT: Background Data Transfer
eNA: enablers for Network Automation
GPSI Generic Public Subscription Identifier
IoT Internet of Things
KPI: Key Performance Indicators
ML: Machine Learning
NEF: Network Exposure Function
NF: Network Function
NRF: Network Repository Function
NSI: Network Status Information
NWDAF: Network Data Analytics Function
OAM: Operations Administration and Maintenance
PCF: Policy Control Function
PFD: Packet Flow Description
SBA: Service Based Architecture
SBI: SBA Interface
SMF: Session Management Function
SUPI Subscription Permanent Identifier
UDR: Unified Data Repository
UDM: Unified Data Management
UE: User Equipment
UPF: User Plane Function In the following description, it is referred to the following documents:
[1] 3GPP TR 23.791, "Study of enablers for Network Automation for 5G", V16.2.0, June. 2019.
[2] 3GPP TS 23.501, "System architecture for the 5G System (5GS)", V16.2.0, September 2019.
[3] 3GPP TS 23.502, "Procedures for the 5G System (5GS)", V16.2.0, September 2019.
[4] 3GPP TS 29.522, "5G System; Network Exposure Function Northbound APIs; Stage 3", V16.1.0, June. 2019.
[5] 3GPP TS 23.288, "Architecture enhancements for 5G System (5GS) to support Network Analytics Services", V16.1.0, September 2019.
[6] 3GPP S2-1905157, "WID: Study on Enablers for Network Automation for 5G—Phase 2", TSG-SA WG2 Meeting #133, May 2019.
[7] 3GPP S2-1903811, "Discussion on further Criteria for NWDAF Discovery and Selection", TSG-SA WG2 Meeting #132, April 2019.
[8] 3GPP TS 29.505, "Usage of the Unified Data Repository services for Subscription Data; Stage 3", v16.0.0, September 2019.

Example embodiments, although not limited to this, relate to providing analytic services in a network. The concept of network analytics has been introduced in the 3GPP core network with the advent of the Network Data Analytics Function (NWDAF) [1], [5], [6]. NWDAF is incorporated in the 5G System as a Network Function (NF) that comprise a part of the Service Based Architecture (SBA). It interacts with other core NFs via the means of the SBA Interface (SBI) referred to as Nnwdaf and follows the consumer-producer paradigm, i.e. collecting data and local information from NF, Application Functions (AFs), Unified Data Repository (UDR) and Operations Administration and Maintenance (OAM), and delivers statistics and prediction notifications to subscribed NFs and AFs.

SUMMARY OF THE INVENTION

Example embodiments of the present invention aim to improve handling of network analytics, in particular concerning triggering of analytics services.

According to a first aspect, an apparatus is provided, in a user data holding entity, the apparatus comprising: at least one processor and at least one memory including computer program code, the at least one memory and the computer program code configured to, with the at least one processor, cause the apparatus at least to perform: holding analytic services information related to a user equipment or application in the user data holding entity, and providing the analytic services information, which is related to the user equipment or to an application related to the user equipment, to a network element subscribed to the analytic services information related to the user equipment or application or to a network element requesting such analytic services information related to the user equipment or application.

According to a second aspect, a method is provided, in a user data holding entity, the method comprising:
holding analytic services information related to a user equipment or application in the user data holding entity, and
providing the analytic services information, which is related to the user equipment or to an application related to the user equipment, to a network element subscribed to the analytic services information related to the user equipment or application or to a network element requesting such analytic services information related to the user equipment or application.

The first and second aspects may be modified as follows:
The analytic services information may comprise analytic services and/or analytic triggering conditions.

The analytic services in the user data holding entity may be identified by analytic identifiers.

The analytic triggering conditions may comprise a user context information and/or network conditions and/or a location.

The subscription to the analytic services information related to the user equipment or application may be preconfigured.

The at least one memory and the computer program code may be configured to, with the at least one processor, cause the apparatus to further perform: receiving a request for the subscription to the analytic services information related to the user equipment or application from a network element.

The method may further comprise:
receiving a request for the subscription to the analytic services information related to the user equipment or application from a network element.

The at least one memory and the computer program code may be configured to, with the at least one processor, cause the apparatus to further perform: receiving the analytics service information related to the user equipment or application from a network element, and storing the analytics service information in the user data holding entity.

Alternatively, the method may further comprise:
receiving the analytics service information related to the user equipment or application from a network element, and
storing the analytics service information in the user data holding entity.

According to a third aspect, an apparatus is provided, in a network element, the apparatus comprising: at least one processor and at least one memory including computer program code, the at least one memory and the computer program code configured to, with the at least one processor, cause the apparatus at least to perform: receiving analytics service information related to a user equipment or application from a user data holding entity, and triggering an analytic service with respect to the user equipment or application based on the received analytic services information.

According to a fourth aspect, a method is provided, in a network element, the method comprising:
receiving analytics service information related to a user equipment or application from a user data holding entity, and
triggering an analytic service with respect to the user equipment or application based on the received analytic services information.

The third and fourth aspects may be modified as follows:

The at least one memory and the computer program code may be configured to, with the at least one processor, cause the apparatus to further perform: receiving the analytics service information via an intermediate network element.

The method may further comprise:
receiving the analytics service information via an intermediate network element.

The analytic services information may comprise analytic services and/or analytic triggering conditions.

The analytic services may be identified by analytic identifiers.

The at least one memory and the computer program code may be configured to, with the at least one processor, cause the apparatus to further perform: subscribing to the analytic services information related to the user equipment or application with the user data holding entity, or requesting the analytic services information related to the user equipment or application from the user data holding entity.

The method may further comprise:
subscribing to the analytic services information related to the user equipment or application with the user data holding entity, or
requesting the analytic services information related to the user equipment or application from the user data holding entity.

The at least one memory and the computer program code may be configured to, with the at least one processor, cause the apparatus to further perform: subscribing to the analytic service information or requesting the analytic services information via an intermediate network element.

The method may further comprise:
subscribing to the analytic service information or requesting the analytic services information via an intermediate network element.

The at least one memory and the computer program code may be configured to, with the at least one processor, cause the apparatus to further perform: triggering the analytic service based on the analytic triggering conditions indicated by the analytic services information, wherein the analytic triggering conditions comprises a user context information and/or network conditions and/or a location.

The method may further comprise:
triggering the analytic service based on the analytic triggering conditions indicated by the analytic services information,
wherein the analytic triggering conditions comprises a user context information and/or network conditions and/or a location.

The analytic triggering conditions may further comprise conditions when the user equipment registers with the network, establishes or modifies a data session, instantiates an associated application, or enters a certain location, or changes context.

The subscription to the analytic services information related to the user equipment or application to the user data holding entity may be preconfigured.

The at least one memory and the computer program code may be configured to, with the at least one processor, cause the apparatus to further perform: transmitting a request for the subscription to the analytic services information related to the user equipment or application to the user data holding entity.

The method may further comprise:
transmitting a request for the subscription to the analytic services information related to the user equipment or application to the user data holding entity.

The at least one memory and the computer program code may be configured to, with the at least one processor, cause the apparatus to further perform: transmitting the request to the user data holding entity via another network element.

The method may further comprise:
transmitting the request to the user data holding entity via another network element.

According to a fifth aspect, an apparatus is provided, in a network element, the apparatus comprising: at least one processor and at least one memory including computer program code, the at least one memory and the computer program code configured to, with the at least one processor, cause the apparatus at least to perform: configuring analytics service information related to a user equipment or application, and providing the analytics service information to a user data holding entity.

According to a sixth aspect, a method is provided, in a network element, the method comprising: configuring analytics service information related to a user equipment or application, and
providing the analytics service information to a user data holding entity.

The fifth and sixths aspects may be modified as follows:

The analytic services information may comprise analytic services and/or analytic triggering conditions.

The analytic services in the user data holding entity may be identified by analytic identifiers.

The analytic triggering conditions may comprise a user context information and/or network conditions and/or a location.

The at least one memory and the computer program code may be configured to, with the at least one processor, cause the apparatus to further perform: providing the analytics service information to the user data holding entity via another network element.

The method may further comprise:
providing the analytics service information to the user data holding entity via another network element.

According to an seventh aspect of the present invention a computer program product is provided which comprises code means for performing a method according to any one of the second, fourth and sixth and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to an eighth aspect an apparatus is provided which comprises means for holding analytic services information related to a user equipment or application in the user data holding entity, and means for providing the analytic services information, which is related to the user equipment or to an application related to the user equipment, to a network element subscribed to the analytic services information related to the user equipment or application or to a network element requesting such analytic services information related to the user equipment or application.

According to a ninth aspect, an apparatus is provided which comprises means for receiving analytics service information related to a user equipment or application from a user data holding entity, and means for triggering an analytic service with respect to the user equipment or application based on the received analytic services information.

According to a tenth aspect, an apparatus is provided which comprises means for configuring analytics service information related to a user equipment or application, and means for providing the analytics service information to a user data holding entity.

The eighth, ninth and tenth aspects may be modified similar as the first, third and fifth aspects.

BRIEF DESCRIPTION OF THE DRAWINGS

These and other objects, features, details and advantages will become more fully apparent from the following detailed description of example embodiments of the present invention which is to be taken in conjunction with the appended drawings, in which.

DETAILED DESCRIPTION OF EXAMPLE EMBODIMENTS

In the following, description will be made to example embodiments of the present invention. It is to be understood, however, that the description is given by way of example only, and that the described example embodiments are by no means to be understood as limiting the present invention thereto.

Before describing example embodiments in detail, the problem underlying the present application is described in some more detail.

3GPP enablers for Network Automation (eNA) [1], [5] states that NWDAF is a logical entity with several instances, which can perform different types of analytics at distinct network locations. Currently, NWDAF can provide a set of analytic services but there is no notion of when to trigger and how to associate them with a certain premium user or application(s) under certain circumstances. Being capable to select the appropriate NWDAF instance and the desired location with respect to a specific UE and application(s) can bring a significant advantage for the value of the analytics services.

In more detail, the 3GPP NWDAF exploits the means of enhancing the operation of NFs using analytics. However, currently NWDAF is explored from the operational perspective considering the type of offered analytic services, the target UE(s) and area of interest, sources/sinks, etc.

Nevertheless, so far it is not considered when to trigger a certain NWDAF Analytics Service and how to relate it to a certain UE and application. Providing measures to relate triggering of a certain Analytic Service to a certain UE and/or application can provide that a selected Analytic Services can be related as "an added value service" in the sense of e.g. assuring performance for a UE or application type. The time instance in relation with the user context can also influence the selection of the NWDAF type and location for achieving a given target.

The advantage of storing the Analytics ID configuration information in the UDR instead of having the AF requesting analytics directly once the application is instantiated via the means of NEF as described in TS 23.288 [5](clause 6.1.2.2) may include the following:

Analytics may be configured as a premium subscription feature irrespective of a certain application, i.e. it can target a set of application types.

Analytics may be needed even when UE is in idle mode, e.g. security.

Certain network conditions may need to be considered, e.g. level of congestion, which can influence when to trigger an Analytics Service(s) Currently 3GPP does not specify how a subscription profile can be enhanced with preferences related to: (i) the usage of an Analytics Service in relation with a user subscription and application, (ii) the discovery of the appropriate NWDAF instance at the time of instantiating a selected Analytics Service, and (iii) the association of one or more Analytics Service types with the target goal (e.g. performance assurance) considering the user context.

Example embodiments of the present disclosure fill these gaps leveraging the benefits of UDR [8] and/or Network Exposure Function (NEF) [4], which is used to assist a 3rd party AF to subscribe to NWDAF analytics services. The scenario considered focuses on a mobile operator that provides NWDAF with built in Analytics Service types. An external AF or user subscription can then specify a target Key Performance Indicator (KPI) in relation with a user subscription and application, which can govern the selection of the Analytics Service type and location.

In the following, some network elements involved with some example embodiments are shortly described:

NEF [2] [3] [4] allows network capability exposure towards an external 3rd party AFs in terms of: (i) network events monitoring, (ii) provisioning capability towards external functions, (iii) policy and charging capabilities toward external NFs/AFs and (iv) core network internal capabilities for analytics (monitoring and data correlation, i.e. AF to provide an expected UE and/or service behaviour). NEF allows the interaction of an external AF with the NWDAF as it has been considered in [1][5]:

AF provides the observed service experience data, which allows operator to check, i.e. correlate, against the provisioned service quality.

AF provides periodically, according to a subscription, a list of data blocks called Collectable Data Items, feeding the NWDAF with particular data.

NEF provides NWDAF metadata to AF in order to select the analytics services that it would subscribe to the NWDAF focusing on monitoring events.

Network conditions may change impacting the Background Data Transfer (BDT) policy agreed with AF; the NWDAF can notify the Policy Control Function (PCF) of potential congestion experience allowing the PCF to re-negotiate policy with the AF.

AF to retrieve Network Status Information (NSI) with respect to a specific geographical area.

AF to retrieve NSI with respect to a specific geographical area for a particular UE.

In summary, the role of NEF related to NWDAF concentrates on (i) providing AF data to the network, (ii) allow the AF to monitor analytics and network information, (iii) analytics metadata that allow the AF to subscribe to monitoring events and (iv) on policy re-negotiation.

The role of NEF has also been extended in the context of NWDAF in 3GPP TS 23.288 [5] to allow collecting data from AF by 5G Core Network.

UDR typically holds subscription related information with respect to a specific UE [8]. NEF may also facilitate an AF subscription to the UDR with respect to a particular service, e.g. device notification for MICO devices, including also Analytic Services, e.g. for security [1][5].

When multiple instances of the NWDAF are considered within the mobile network, the NF or AF shall utilize the Network Repository Function (NRF) to discover the desired NWDAF instance unless information is available by other means, e.g. locally configured on NF consumers. The following factors may be considered for the selection of the NWDAF including, S-NSSAI, Analytics ID and NWDAF Serving Area information, i.e. list of cell(s) or Tracking Areas (TAs).

An AF can subscribe to a specific NWDAF type using the Analytics ID, indicating the target of analytics reporting i.e. UE or set of UEs, analytics filter (e.g. type of parameters), analytics reporting information (including event, maximum reports, duration, level of aggregation, etc.), observation period, level of accuracy, validity period, confidence degree and the correlation information [5].

An AF can also provide a geographical area of interest for getting notifications of the NWDAF analytics, which can be mapped in the Analytics Serving Area Information [7].

As mentioned above, according to example embodiments, measures are provided by which handling of analytic services can be enhanced.

In the following, a general overview of some example embodiments is described by referring to FIGS. 1A, 1B, 2A and 2B.

Figure 1A:
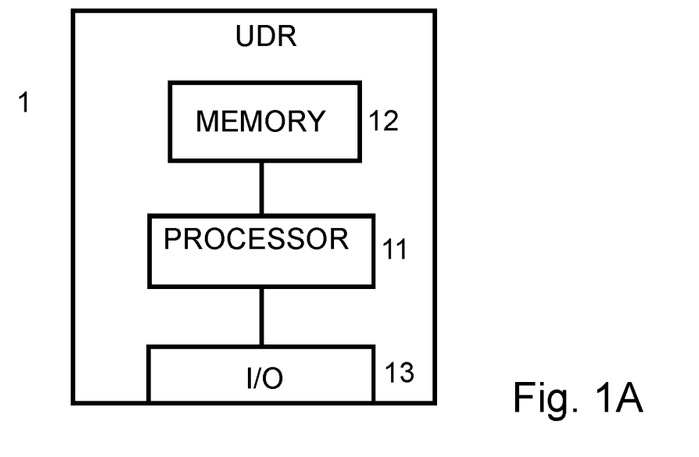
FIG. 1A shows an UDR 1 according to an example embodiment.
Figure 1B:
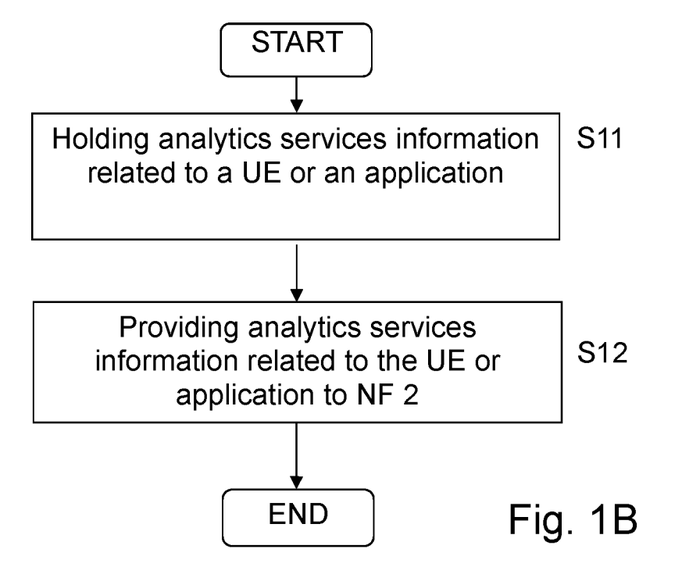
FIG. 1B shows a method carried out by the UDR 1 according to the example embodiment.

FIG. 1A shows an UDR 1 as an example for a first apparatus according to the present example embodiment. The apparatus may be a user data holding entity such as the UDR or a similar network element in which user data are hold and/or managed. The apparatus may the user data holding entity or may be a part thereof, or may include the functionality of the user data holding entity besides other functionalities. A procedure carried out by the UDR 1 is illustrated in FIG. 1B.

The UDR 1 comprises at least one processor 11 and at least one memory 12 including computer program code. The at least one processor 11, with the at least one memory 12 and the computer program code, is configured to cause the apparatus to perform: holding analytic services information related to a user equipment or application in the user data holding entity (the, e.g., UDR 1) (as shown in S11 of FIG. 1B), and providing the analytic services information, which is related to the user equipment or to an application related to the user equipment, to a network element (e.g., NF 2 shown in FIG. 2A) subscribed to the analytic services information related to the user equipment or application or to a network element requesting such analytic services information related to the user equipment or application (as shown in S12 of FIG. 1B).

Figure 2A:
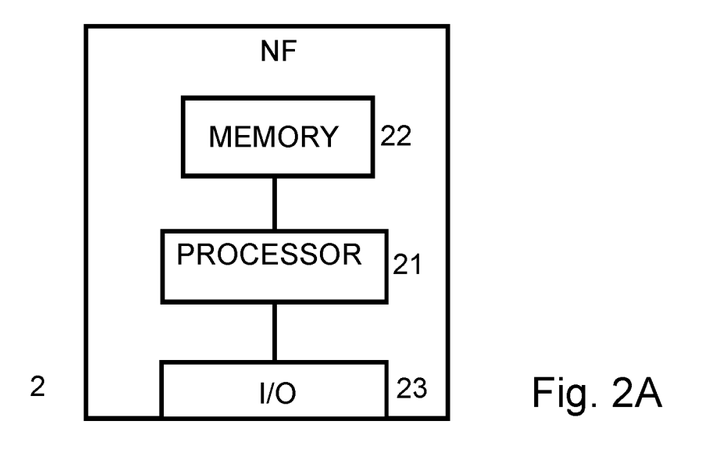
FIG. 2A shows a NF 2 according to an example embodiment.
Figure 2B:
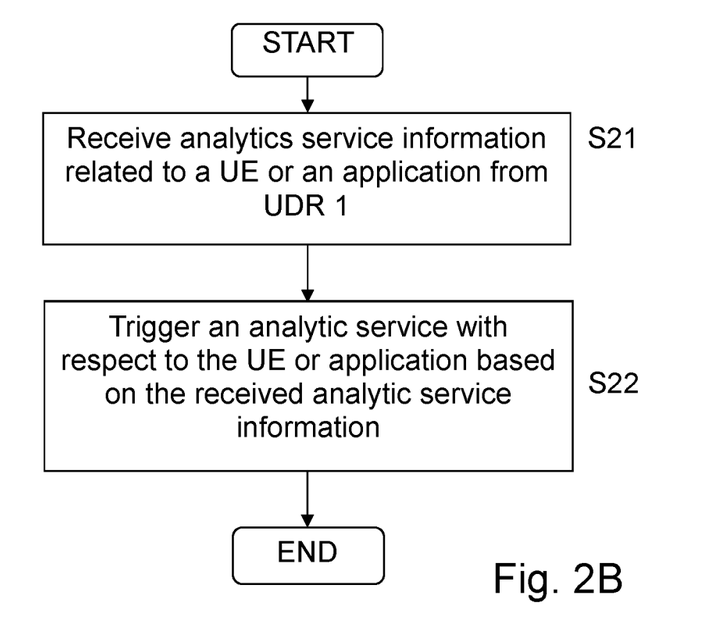
FIG. 2B shows a method carried out by the NF 2 according to the example embodiment.

FIG. 2A shows an NF 2 as an example for a second apparatus according to the present example embodiment. The apparatus may be the NF, or may be a part thereof. A procedure carried out by the NF 2 is illustrated in FIG. 2B.

The NF 2 comprises at least one processor 21 and at least one memory 22 including computer program code. The at least one processor 21, with the at least one memory 22 and the computer program code, is configured to cause the apparatus to perform: receiving analytics service information related to a user equipment or application from a user data holding entity (e.g., UDR 1 shown in FIG. 1A) (as illustrated in S21 of FIG. 2B), and triggering an analytic service with respect to the user equipment or application based on the received analytic services information (as illustrated in S22 of FIG. 2B).

Figure 3A:
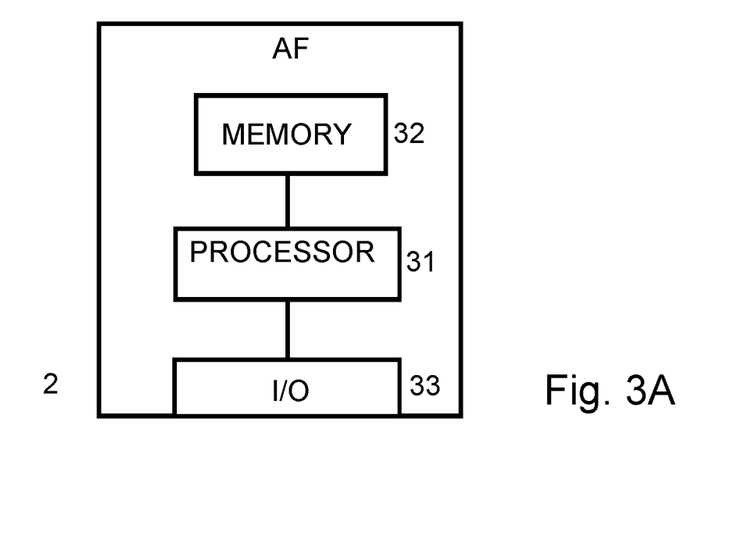
FIG. 3A shows an AF 3 according to an example embodiment.
Figure 3B:
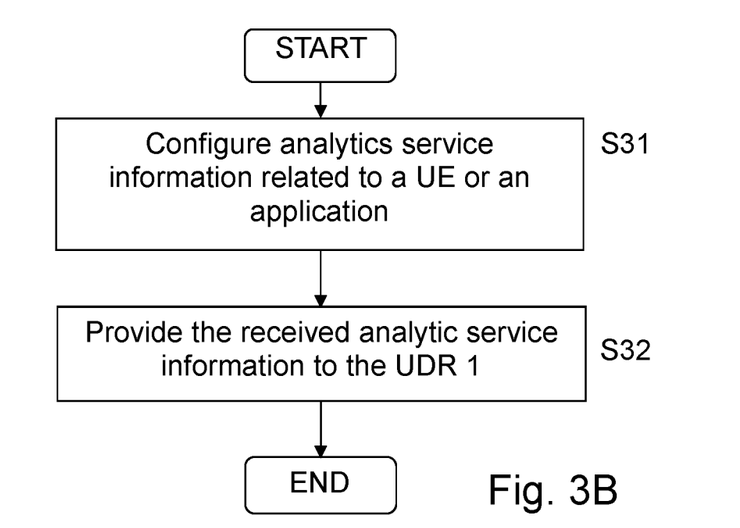
FIG. 3B shows a method carried out by the AF 3 according to the example embodiment.

FIG. 3A shows an AF 3 as an example for a third apparatus according to the present example embodiment. The apparatus may be the AF, or may be a part thereof. A procedure carried out by the AF 3 is illustrated in FIG. 3B. Furthermore, the apparatus may be any kind of entity which is capable of configuring analytics service information related to an UE or an application.

The AF 3 comprises at least one processor 31 and at least one memory 32 including computer program code. The at least one processor 31, with the at least one memory 32 and the computer program code, is configured to cause the apparatus to perform: configuring analytics service information related to a user equipment or application, as shown in S31 of FIG. 3B, and providing the analytics service information to a user data holding entity (e.g., UDR 1 shown in FIG. 1A), as shown in S32 of FIG. 3B.

The UDR 1 may further comprise an I/O unit 13, which is capable of transmitting to and receiving from other network elements such as the NF 2, for example, likewise, the NF 2 may further comprise an I/O unit 23, which is cable of transmitting to and receiving from network elements such as the UDR 1, for example, and the AF 3 may further comprise an I/O unit 33 which is cable of transmitting to and receiving from network elements such as the UDR 1, for example.

Thus, according to example embodiments, analytics services information (such as analytics services, analytics services IDs, analytic triggering conditions etc.) are stored in a user data holding entity such as an UDR, and are related to a user equipment or an application. In this way, analytic services can be triggered automatically by the corresponding network functions (e.g., AMF, SMF, PCF etc.).

The network element described above may be an NF (e.g. NEF, AMF, SMF, PCF etc) or an AF.

In the following, some more detailed embodiments are described.

As mentioned above, some example embodiments aim to provide the means for mobile network operators or AFs to configure an "added value service", e.g. related to performance assurance with certain KPIs, for a specific user and application by leveraging the benefits of Analytics Services offered by the NWDAF. Such an "added value service" can be realized by allowing the AF to provide in the user subscription at the UDR details related to either:

1) specific Analytics Service(s)
2) analytic triggering conditions that assists the selection of specific Analytic Service(s)

In both cases the establishment of the Analytics Service(s) can be triggered by the network, e.g. AMF, or SMF, or PCF (i) for premium users, (ii) once the user instantiates a corresponding application, (iii) when a UE enters a specific geographical area, (iv) when a UE changes its state, e.g. static to mobile, (v) when the network state changes, e.g. the congestion level changes. The selection of the type and location of the desired Analytics Service(s) relies on the user context information, e.g. mobility, speed, device type, location etc., and/or on the network conditions, e.g. congestion, or NF resource availability considering, e.g. computation and storage resources.

The corresponding NF, e.g. AMF, or SMF, or PCF, can use the observed target, e.g. UE(s), application, area of interest, etc., to select the Analytic Service(s) needed, i.e. Analytics ID(s), for assuring that the UE and/or application performance targets, are fulfilled with a lower risk, e.g. introducing a mobility Analytics Service when a user starts moving to predict user mobility. To offer such Analytics ID selection, each NF needs to be aware of a UE and/or application, which is associated with such analytics "added value service" once each NF firstly interact with the UDR.

According to example embodiments, a method is provided to allow:

1. Storage of Analytic Services and/or analytic triggering conditions in the UDR related to a certain UE or application considering:
   a. Analytic Services conveyed via the means of Analytics IDs
   b. Desired performance targets that can be related and/or assured with the assistance of a specific Analytics IDs considering the UE location (e.g. area of interest or congested area) and UE context (e.g. mobility).
2. Method of introducing and/or conveying Analytics IDs and/or analytic triggering conditions in the UDR associated with a UE, set of UE(s) or application considering the means of:
   a. Subscription pre-configuration by the mobile network operator.
   b. AF configuration considering a trusted entity.
   c. 3rd party AFs (i.e. untrusted) configuration via NEF. NEF extensions are needed for handling new subscription related to UE Analytic Service(s) configuration at the UDR.
3. Network Function (NF) to trigger the specified (in UE's UDR) Analytics Service(s) once a UE or set of UEs: (i) establish or modify a PDU session, (ii) instantiate an associated application or (iii) enters a certain location (e.g. area of interest) or changes context e.g. start moving. Alternatively, NFs can trigger such Analytics Service(s) upon certain network conditions, e.g. network congestion level changes. The NF involved may be different depending on the occasion and can include (but not limited to):
   a. AMF when a UE registers or instantiates and/or modifies a PDU connection associated with the indicated application.
   b. SMF once a UE request a PDU session establishment or upon a network triggered modification, e.g. when UE(s) enter an area of interest or the network congestion level changes.
   c. PCF to apply a new policy for UE(s) when the related context change, e.g. in terms of mobility.

NF extensions should allow to trigger the desired Analytics Service type determined by the analytic triggering conditions, e.g. UE mobility state, area of interest, and network congestion level, in order to assure the desired performance targets.

Figure 4:
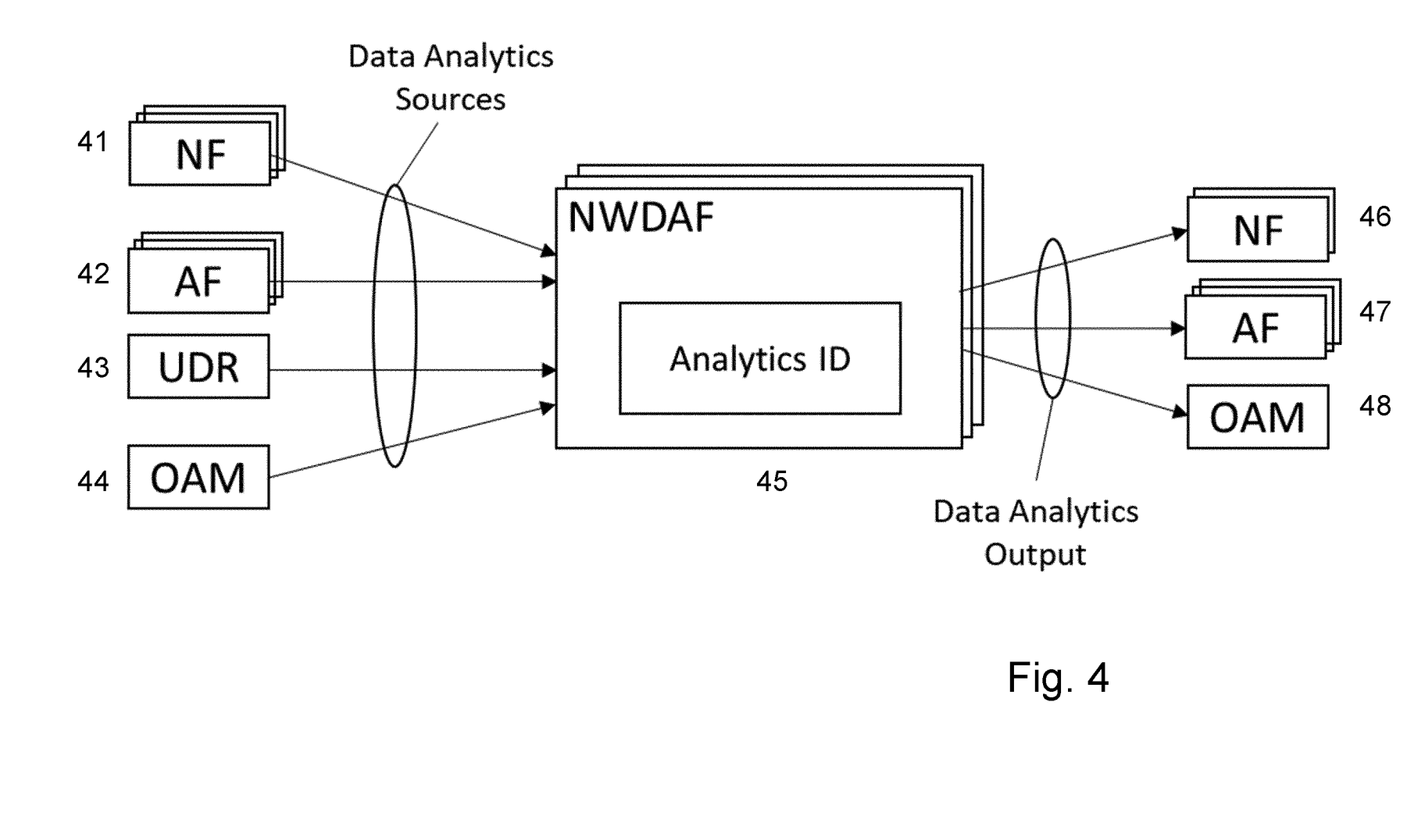
FIG. 4 shows an overview of a data analytics system focusing on NWDAF, and FIG. 5 (consisting of FIGS. 5A, 5B and 5C) shows AF subscription create procedures via NEF to configure NWDAF services per application at UDR according to example embodiments.

Example embodiments are described in the following by concentrating on Analytic Services considering the system illustrated in FIG. 4, showing data sources (including NFs 41, AFs 42, UDR 43 and OAM 44), data collector and analytics model (NWDAF 45), and sinks (NFs 46, AFs 47 and OAM 48).

A method according to an example embodiment creates and stores analytic services in the UDR, either in the form of an Analytics ID or as analytic triggering conditions that can be mapped on Analytics ID(s), or as a combination of both Analytics ID and analytics triggering conditions, considering the user behaviour and network state. Such analytics subscription data information can (i) be used to assist a UE(s) or set of UE(s) and/or an application and/or (ii) be used upon a change of the network state, e.g. based on congestion levels, and/or the UE state, e.g. static to mobile or UE entering an area of interest.

According to the present example embodiment, different NWDAF deployment models are applied, e.g. when only one NWDAF is deployed in the network, or also when the network operator deploys different instances of the NWDAF supporting certain analytics capabilities residing at one or more distinct locations. The selection of a NWDAF instance should be performed once needed considering the UE subscription. The NWDAF selection shall be performed based on Analytics ID in combination with the target UE context information, e.g. position, mobility state, and NWDAF function state, e.g. availability, load, etc., and network state, e.g. load, fault, alarm, emergency, etc.

The UDR information related to analytic services can be: (i) pre-configured by the mobile operator, e.g. for premium users, (ii) configured by an internal AF in relation with an application, and (iii) configured by a 3rd party AF (untrusted) via NEF in relation with an application.

NEF extensions should allow an AF to perform for a UE or application subscription to the UDR one or more of the following activities but not limited to:

1. Subscribe an Analytics Service(s) ID with respect to a specific UE and possibly an application, i.e. in the user subscription profile, which allows the activation of such NWDAF service:
   a. Once a UE registers and/or establishes a PDU connection
   b. Once a certain application is instantiated, e.g. when a PDU connection is established.
   c. Upon a certain situation e.g. instantiate a load analytics during peak times.
   d. Upon a notification of a special event, e.g. emergency.
   e. For a specific network slice.
   f. For IMS service.
2. Subscribe a set of analytic triggering conditions with respect to a specific UE and possibly an application, in the user subscription profile, a. Allow the selection of specific Analytic Service(s) type once a certain application is instantiated and/or once a UE enters a specific geographical area considering (i) UE context, e.g. in terms of the mobility state and/or (ii) network conditions, e.g. congestion level.

The selection of specific NWDAF instance location, which typically considers UE location when application is instantiated, or network state, e.g. congestion level, or area of interest, etc., can be triggered based on the measures according to the present example embodiment when this is needed. Each NF shall also be able to know which type of Analytics ID(s) are needed and shall be initiated, and under which user and network conditions. If an analytics service is related to an application, the UE should provide the corresponding Application Identifier (APP ID), which is the conventional operation.

Once the corresponding subscription is in place at the UDR, certain NFs can use it. In the following some examples are described, wherein, however, the example embodiments are not limited therein.

For example, the AMF can retrieve (from UDR) the analytics subscription during the UE registration or when establishing a PDU session, and can monitor UE mobility triggering the following Analytics IDs once needed:
  a. NF Load Analytics—when a UE enters an area of interest.
  b. UE Mobility Information—to predict mobility when a UE changes mobility state.
  c. UE Communications Analytics—to identify communication patterns for user plane traffic, once a UE enters an area of interest.
  d. Abnormal Behaviour—to identify if UE is misused or hijacked.

The SMF can also retrieve analytics subscription information (from UDR) when PDU session is established or modified and can monitor PDU session including related performance parameters from the corresponding UPF(s) triggering the following Analytics IDs once needed:
  a. Service Experience—for a specific application to fine-tune the PDU QoS.
  b. NF Load Analytics—for traffic steering considering the load of a specific NF with respect to availability, etc.
  c. Network Performance—for traffic steering considering the load per NF, e.g. UPF.
  d. UE Communications Analytics—to identify communication patterns for user plane traffic and perform a fine-tuned resource allocation and traffic steering.
  e. Data Congestion Analytics—in the data and control plane for e.g. adjusting the PDU session characteristics.

The PCF can retrieve analytics subscription information (from UDR) to assure the desired performance and monitor the allocated QoS triggering the following Analytics IDs when needed:
  a. Service Experience—for a specific application in order to adopt the policy accordingly.
  b. QoS Modification Analytics—for adjusting the related policy.

Figure 5A:
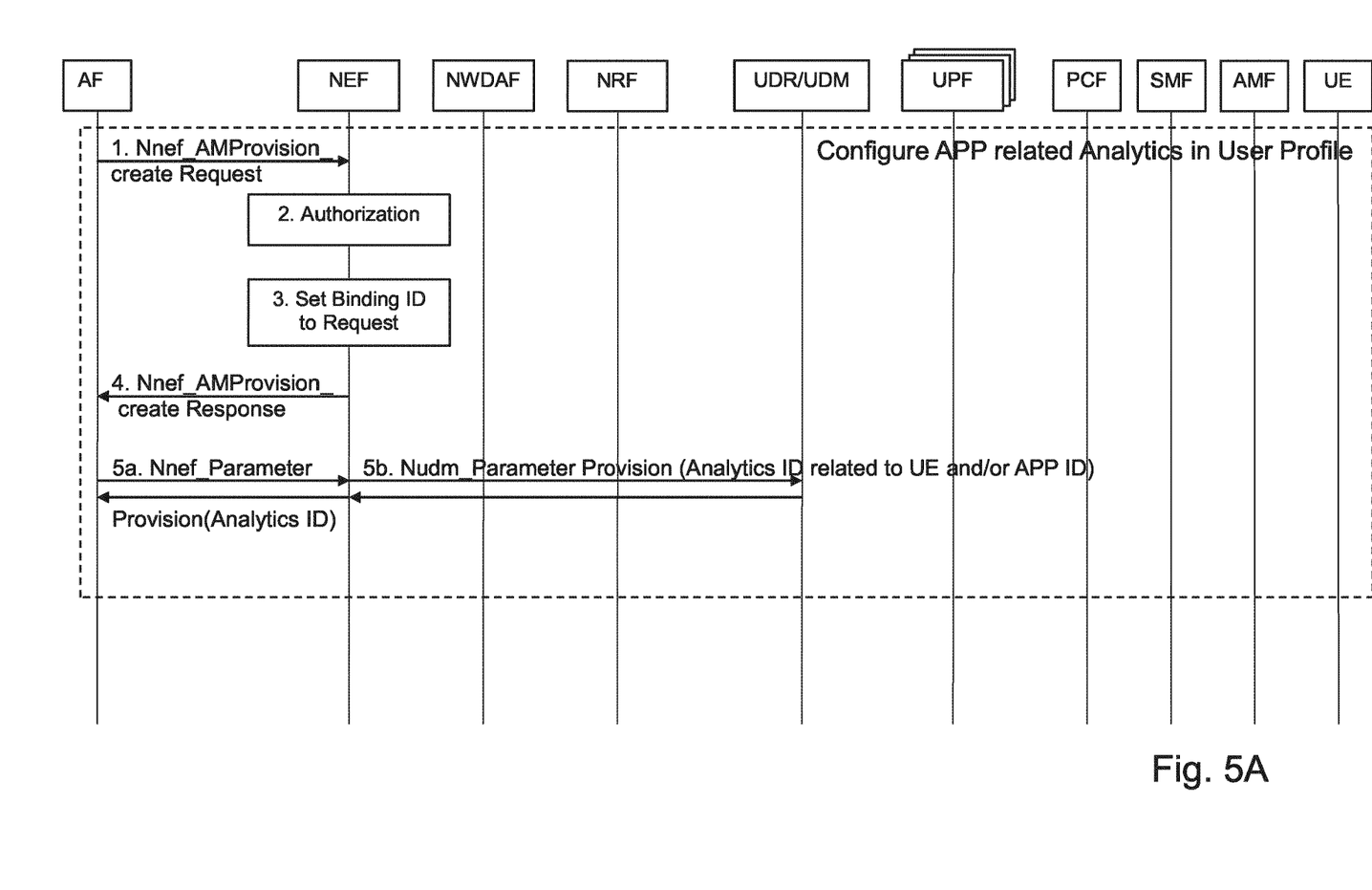
Figure 5B:
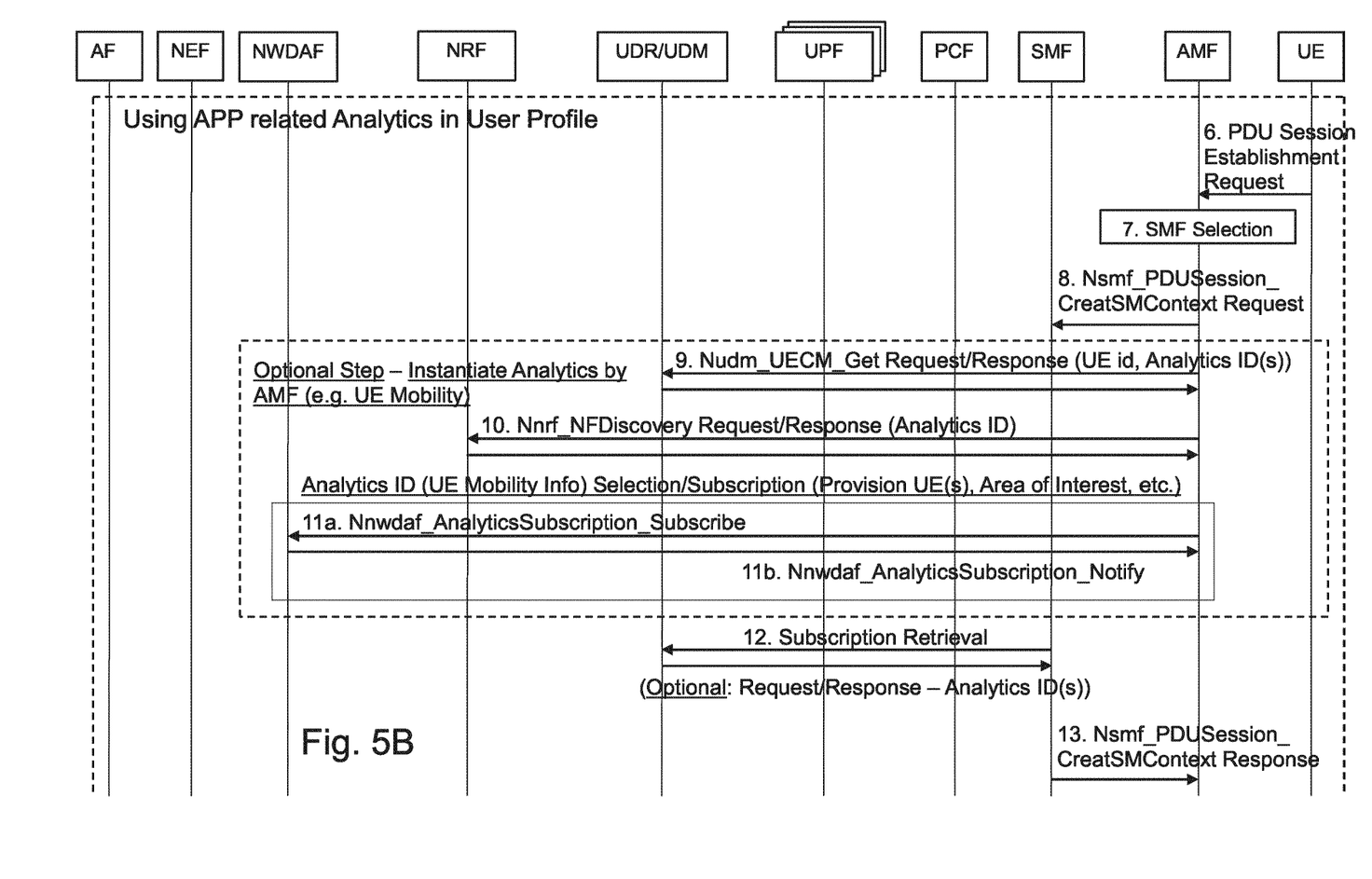
Figure 5C:
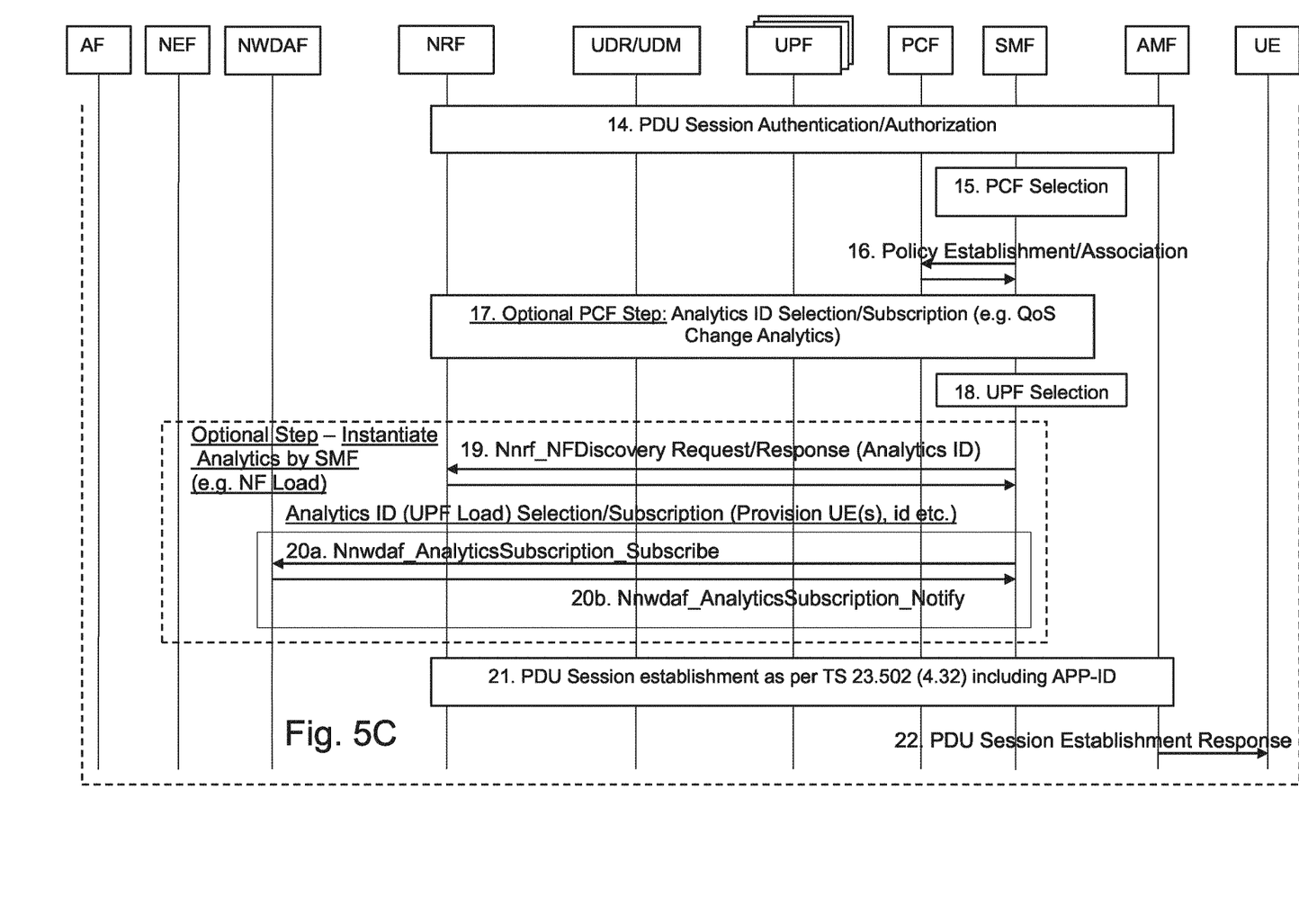

An AF can configure certain subscription information that contains a specific Analytics ID or set of specific Analytics ID from the ones specified in [5] for a certain UE and/or application. An overview of the subscription configuration and usage is illustrated in FIG. 5. FIG. 5 shows an AF subscription create procedure to configure NWDAFR services per application at the UDR.

Initially the AF issues a create request (step 1) towards the NEF, which authorizes the AF and creates the related bindings (step 2 and step 3), before it responds back (step 4).

Once the NEF authorises the AF, the AF can then issue a create data analytics subscription via the NEF for configuring a specific Analytics ID or set of specific Analytics ID for a certain UE and/or application at the UDR (step 5a, 5b).

To enable the UDR to hold information related to Analytic Service(s), the UDR is enhanced to contain together with the subscription data one or more of the following types of information: Analytics ID(s), Application identifier (APP ID(s)), UE mobility state (e.g. static, low, high mobility), network congestion state (network load beyond specified threshold), area of interest, time, emergency event, alarm notification, etc. In case such Analytic Service subscription information is related to e.g. a premium user or IoT UEs, then steps 1 to 5 may no longer be needed and the mobile operator can then pre-configure such subscription information to the UDR.

The Analytics Service will be initiated once a UE connects to the network and consumes the specified application. Equally the Analytics Service can be instantiated when a UE issues a PDU session modification or when it starts to move, i.e. performs a handover. All these cases can be treated similarly with the UE issuing a message potentially including the application identifier (APP ID) related with the PDU connection towards the network.

For the case of PDU establishment, the UE issues a request indicating potentially the Application identifier (APP ID) (step 6). The AMF that receives such request selects the SMF (step 7) and issues a create context request (step 8). Optionally the AMF can instantiate an Analytic Service, e.g. UE Mobility, (steps 9-11). To introduce an Analytics Service, the AMF contacts the UDR (via UDM) to obtain the Analytics ID for, e.g. a target UE, (step 9), which is then used to select the corresponding NWDAF instance after consulting the NRF (step 10). The AMF can then subscribe to the indicated NWDAF providing the desired Analytics ID and supplementary information including the target UE id, Area of Interest, etc. (step 11a subscribe and step 11b notify).

The SMF would need to retrieve the UE subscription information from the UDR (via UDM) (step 12) and optionally acquire the use of an Analytics Service, receiving the desired Analytics ID if that is the case. The SMF can then reply to the AMF with a PDU session create response (step 13), before the PDU authentication/authorization takes place (step 14). The SMF selects the corresponding PCF (step 15), and then issues a policy establishment/association (step 16). The PCF can then optionally configure the use of an Analytics Service acquiring from the UDM the corresponding Analytics ID, e.g. QoS Changing Analytics, and discovering via the NRF the desired NWDAF before subscribing to it (step 17).

Once the corresponding policy is in place, the SMF can then select the appropriate UPF(s) (step 18). The SMF can optionally instantiate an Analytics Service related to the APP ID, e.g. NF load, (step 19-20) provided that in step 12 it has obtained the desired Analytics ID. The SMF then discovers the NWDAF using such an Analytics ID (step 19) and then subscribes to it providing, e.g. the target UE id (step 20 a subscribe and step 20b notify). The remaining process for establishing the PDU session is performed as per TS 23.502 (Clause 4.3.2) (step 21). Once everything is setup, the AMF then provides a response to the UE related to the PDU session establishment (step 22).

In an alternative example embodiment, UDR subscription can contain an Analytics ID type associated with a UE and/or an application introducing also an applicability condition(s), e.g. if the congestion level is beyond a threshold or in case of an alarm. In this case the corresponding NF needs to assess the network conditions with the help of e.g. NWDAF or Management Services, special event, time, or other indicator of a special condition, before it can use such an Analytics ID (provided in step 9 for the case of AMF, step 12 for SMF and step 17 for the PCF). In yet an alternative example embodiment, the UDR subscription can contain the analytics triggering conditions indicating the use of analytics but without specifying explicitly the Analytics ID type(s).

The possible contents related to Analytic Service Subscription Data as introduced by this invention are shown in table below, which could be added to table 5.2.3.3.1-1 from 3GPP TS 23.502 [3]. Corresponding data keys are also detailed in possible amendments to table 5.2.12.2.1-1 from 3GPP TS 23.502 [3], where analytic services subscription data is added to subscription data, application data and policy data (another embodiment would be to only have analytic services subscription data included only in subscription data).

TABLE 5.2.3.3.1-1

UE Subscription data types (TS 23.502)

| Subscription data type | Field | Description |
|---|---|---|
| Analytic Services Subscription Data | Analytic ID-list | List of Analytic Service(s) that a UE has subscription |
| | Application ID | Application that is related to the Analytic ID |

TABLE 5.2.3.3.1-1-continued

UE Subscription data types (TS 23.502)

| Subscription data type | Field | Description |
|---|---|---|
| | Area of Interest | Indicates the area in where the subscribed Analytics ID(s) should be used for a UE or application. |
| | Analytics Time Period - list | Indicate time where an Analytic Service would need to be instantiated for a UE. |
| | Network congestion level | Indicate the network congestion level threshold for instantiating an Analytics Service for a UE |
| | S-NSSAI | The slice for which the analytics service needs to be instantiated |
| | UE Mobility | Trigger the instantiation of the Analytic Service when a UE starts moving |

TABLE 5.2.12.2.1-1

Data keys (TS 23.502)

| Data Set | Data Subset | Data Key | Data Sub Key |
|---|---|---|---|
| Subscription Data (see clause 5.2.3.3.1) | Access and Mobility Subscription data | SUPI | — |
| | SMF Selection Subscription data | SUPI | — |
| | UE context in SMF data | SUPI | PDU Session ID or DNN |
| | SMS Management Subscription data | SUPI | — |
| | SMS Subscription data | SUPI | |
| | Session Management Subscription data | SUPI | S-NSSAI DNN |
| | Slice Selection Subscription data | SUPI | — |
| | Group Data | Internal Group Identifier or External Group Identifier | — |
| | Analytic Service subscription data | SUPI, GPSI, Internal Group Identifier or External Group Identifier | S-NSSAI, DNN |
| Application data | Packet Flow Descriptions (PFDs) | Application ID | |
| | AF traffic influence request information (See clause 5.6.7 and clause 6.3.7.2 in 3GPP TS 23.501 [2]). | AF transaction internal ID S-NSSAI and DNN and/or Internal Group Identifier or SUPI | |
| | Background Data Transfer | Internal Group Identifier or SUPI | |

TABLE 5.2.12.2.1-1-continued

Data keys (TS 23.502)

| Data Set | Data Subset | Data Key | Data Sub Key |
|---|---|---|---|
| | Analytic Service subscription data | Application ID, SUPI, GPSI, Internal Group Identifier or External Group Identifier | S-NSSAI, DNN |
| Policy Data | UE context policy control data (See clause 6.2.1.3 in TS 23.503 [20]) | SUPI | |
| | PDU Session policy control data (See clause 6.2.1.3 in TS 23.503 [20]) | SUPI | S-NSSAI DNN |
| | Policy Set Entry data (See clause 6.2.1.3 in TS 23.503 [20]) | SUPI (for the UDR in HPLMN) PLMN ID (for the UDR in VPLMN) | |
| | Remaining allowed Usage data (See clause 6.2.1.3 in TS 23.503 [20]) | SUPI | S-NSSAI DNN |
| | Sponsored data connectivity profiles (See clause 6.2.1.6 in TS 23.503 [20]) | Sponsor Identity | |
| | Background Data Transfer Data (See clause 6.2.1.6 in TS 23.503 [20]) | Background Data Transfer Reference ID. (NOTE 2) None. (NOTE 1) | |
| | Analytic Service subscription data | Application ID, SUPI, GPSI, Internal Group Identifier or External Group Identifier | S-NSSAI, DNN |
| Exposure Data (see clause 5.2.12.1) | Access and Mobility Information | SUPI or GPSI | PDU Session ID |
| | Session Management information | SUPI or GPSI | or UE IP address or DNN |

NOTE 1:
Retrieval of the stored Background Data Transfer References for all ASP identifiers in the UDR requires Data Subset but no Data Key or Data Subkey(s).
NOTE 2:
Update of a Background Data Transfer Reference in the UDR requires a Data key to refer to a Background Data Transfer Reference as input data.

Thus, as shown above, table 5.2.12.2.1-1 of 3GPP TS 23.502 [3] would be amended as follows:

A new item is added to item "Subscription Data", namely a new Data Subset "Analytic Service subscription data". The new Data Key for this is "SUPI, GPSI, Internal Group Identifier or External Group Identifier". The new Data Sub Key is "S-NSSAI, DNN".

A new item is added to item "Application Data", namely a new Data Subset "Analytic Service subscription data". The new Data Key for this is "Application ID, SUPI, GPSI Internal Group Identifier or External Group Identifier". The new Data Sub Key is "S-NSSAI, DNN".

A new item is added to item "Policy Data", namely a new Data Subset "Analytic Service subscription data". The new Data Key for this is "Application ID, SUPI, GPSI, Internal Group Identifier or External Group Identifier". The new Data Sub Key is "S-NSSAI, DNN".

Thus, according to several example embodiments, it is possible to improve handling of network analytics, in particular concerning triggering of analytic services by subscribing analytic services to a user repository (UDR) or a similar element in the network. In this way, the analytic services can easily be triggered by the network.

Thus, according to some example embodiments, the user subscription data is stored in the UDR. Hence, if it is desired to offer analytics as a service to a particular set of users, for example if in case of autonomous driving it is necessary to make sure that the quality of the network is as needed, then analytics may be added as a service in the subscription profile. In this way, when a user connects to the network and instantiates this application, the network knows that it needs to trigger the appropriate analytic service. The analytic triggering conditions provide a set of options for instantiating an analytics service once needed, i.e. once the conditions specified in the subscription are met.

The above-described example embodiments are only examples and may be modified.

For example, another network function may access the UDR via the UDM, in order to obtain the analytic services information. Moreover, an untrusted AF may access the UDR via an NEF.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22, 32 and executable by the processor (processing resources, processing circuitry) 11, 21, 31 or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22, 32 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21, 31 may be of any type suitable to the local technical environment, and may include one or more of general purpose computers, special purpose computers, microprocessors, digital signal processors (DSPs) and processors based on a multi core processor architecture, as non-limiting examples.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus in a unified data repository, said apparatus comprising:
   at least one processor; and
   at least one memory including computer program code, the at least one memory and the computer program code configured to, with the at least one processor, cause the apparatus at least to perform:
   storing analytic services information related to a user equipment or application in the unified data repository, wherein the unified data repository includes an input/output unit configured to transmit to and receive from other network elements and wherein the analytic services information comprises analytic services and analytic triggering conditions; and
   transmitting the analytic services information, which is related to the user equipment or to an application related to the user equipment, to a network element subscribed to the analytic services information related to the user equipment or application or to a network element requesting such analytic services information related to the user equipment or application,
   wherein the subscription to the analytic services information related to the user equipment or application is preconfigured.

2. The apparatus according to claim 1, wherein the at least one memory and the computer program code are configured to, with the at least one processor, cause the apparatus to further perform:
   receiving the analytics service information related to the user equipment or application from a network element, and
   storing the analytics service information in the unified data repository,
   wherein the unified data repository is configured to contain subscription data and the following types of information: analytics ID, application identifier, user equipment mobility state, network congestion state, area of interest, time, emergency event, and alarm notification.

3. An apparatus in a network element, said apparatus comprising:
   at least one processor; and
   at least one memory including computer program code, the at least one memory and the computer program code configured to, with the at least one processor, cause the apparatus at least to perform:
   receiving analytics service information related to a user equipment or application from a unified data repository [UDR], wherein the network element includes an input/output unit configured to transmit to and receive from other network elements and wherein the analytic services information comprises analytic services and analytic triggering conditions; and
   triggering an analytic service with respect to the user equipment or application based on the received analytic services information,
   wherein the at least one memory and the computer program code are configured to, with the at least one processor, cause the apparatus to further perform:
   triggering the analytic service based on the analytic triggering conditions indicated by the analytic services information, wherein the analytic triggering conditions comprise a user context information, network conditions, and a location, wherein the subscription to the analytic services information related to the user equipment or application to the unified data repository is preconfigured.

4. The apparatus according to claim 3, wherein the at least one memory and the computer program code are configured to, with the at least one processor, cause the apparatus to further perform:

subscribing to the analytic services information related to the user equipment or application with the unified data repository, or requesting the analytic services information related to the user equipment or application from the unified data repository.

5. The apparatus according to claim 3, wherein the apparatus comprises a network function, wherein:

the network function comprises an access and mobility management function when a user equipment registers or instantiates and modifies a PDU connection associated with an indicated application, wherein the access and mobility management function retrieves from the unified data repository an analytics subscription during the user equipment registration or when establishing a PDU session, and monitors user equipment mobility triggering the following Analytics IDs once needed:

network function load analytics when a user equipment enters an area of interest, user equipment mobility Information to predict mobility when a user equipment changes mobility state, user equipment communications analytics to identify communication patterns for user plane traffic once a user equipment enters an area of interest, and abnormal behavior to identify if the user equipment is misused or hijacked.

6. An apparatus in a network element, said apparatus comprising:

at least one processor; and at least one memory including computer program code, the at least one memory and the computer program code configured to, with the at least one processor, cause the apparatus at least to perform:

configuring analytics service information related to a user equipment or application, and providing-transmitting the analytics service information to a unified data repository, wherein the network element includes an input/output unit configured to transmit to and receive from other network elements and wherein the analytic services information comprises analytic services and analytic triggering conditions;

transmitting the analytics service information to the unified data repository via another network element;

wherein the analytic services in the unified data repository are identified by analytic identifiers, and wherein the analytic triggering conditions comprise a user context information, network conditions, and a location.

7. A method in a unified data repository, said method comprising:

storing analytic services information related to a user equipment or application in the unified data repository, wherein the unified data repository includes an input/output unit configured to transmit to and receive from other network elements and wherein the analytic services information comprises analytic services and analytic triggering conditions; and transmitting the analytic services information, which is related to the user equipment or to an application related to the user equipment, to a network element subscribed to the analytic services information related to the user equipment or application or to a network element requesting such analytic services information related to the user equipment or application, wherein the subscription to the analytic services information related to the user equipment or application is preconfigured.

8. A computer program embodied on a non-transitory computer readable medium, said computer program comprising computer readable code which, when executed in an apparatus: causes the apparatus to perform the method according to claim 7.

9. A method in a network element, said method comprising:

receiving analytics service information related to a user equipment or application from a unified data repository, wherein the network element includes an input/output unit configured to transmit to and receive from other network elements and wherein the analytic services information comprises analytic services and analytic triggering conditions; and triggering an analytic service with respect to the user equipment or application based on the received analytic services information, wherein the method further comprises triggering the analytic service based on the analytic triggering conditions indicated by the analytic services information, wherein the analytic triggering conditions comprise a user context information, network conditions, and a location, wherein the subscription to the analytic services information related to the user equipment or application to the unified data repository is preconfigured.

10. A method in a network element, said method comprising:

configuring analytics service information related to a user equipmentor application, and transmitting the analytics service information to a unified data repository, wherein the network element includes an input/outputunit configured to transmit to and receive from other network elements and wherein the analytic services information comprises analytic services and analytic triggering conditions;

transmitting the analytics service information to the unified data repository via another network element;

wherein the analytic services in the unified data repository are identified by analytic identifiers, and wherein the analytic triggering conditions comprise a user context information, network conditions, and a location.

* * * * *